July 3, 1934.   W. G. BAUER   1,965,025
EYESHIELD
Filed June 15, 1933   3 Sheets-Sheet 1
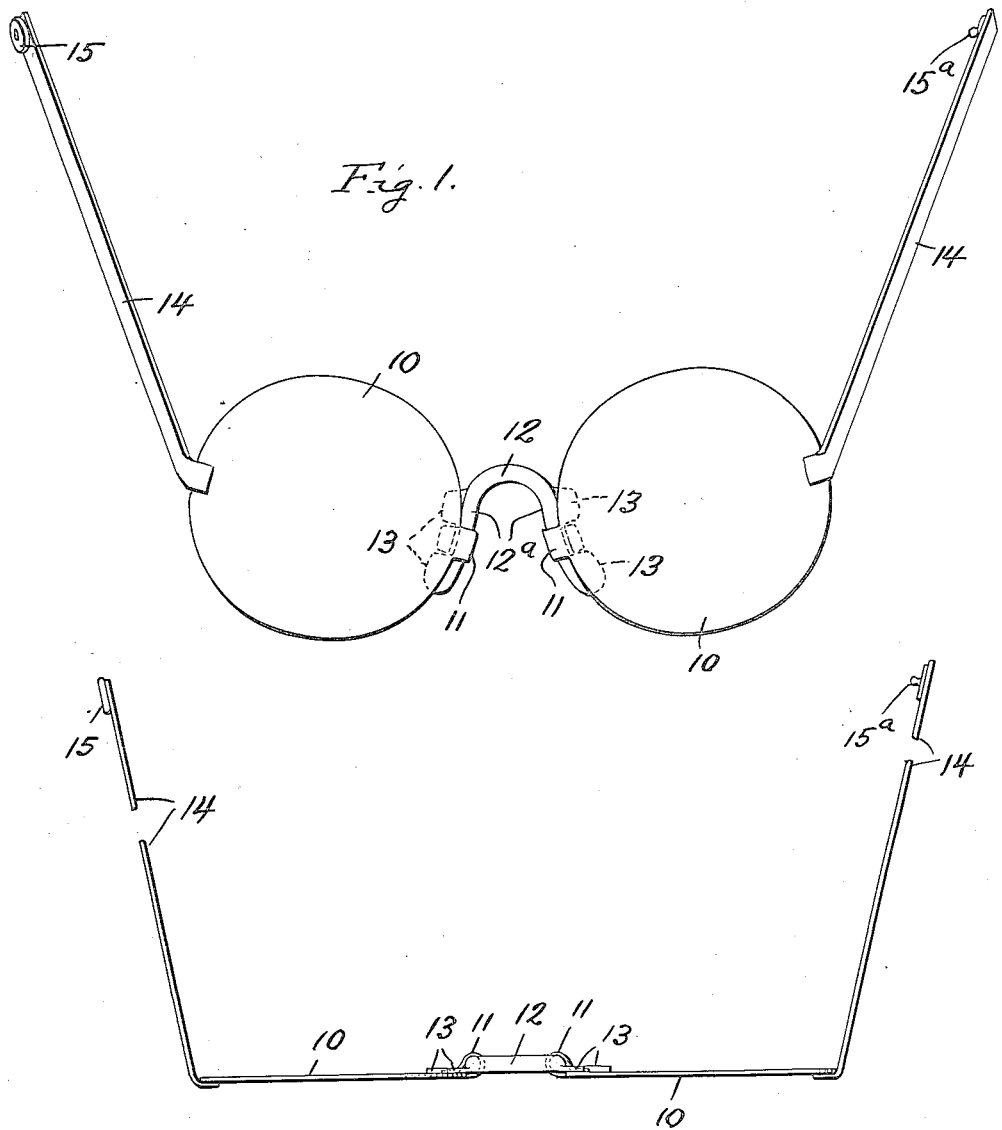
Inventor
William G. Bauer
By Clarence A. O'Brien
Attorney

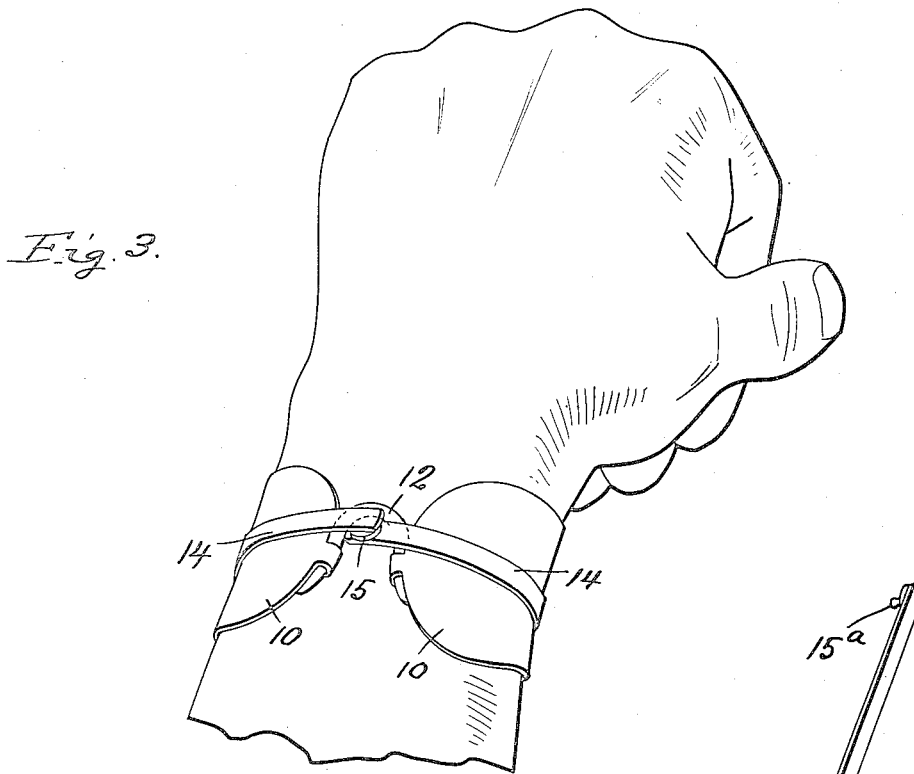
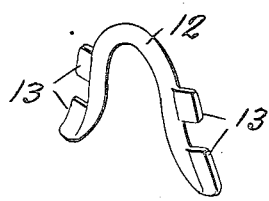
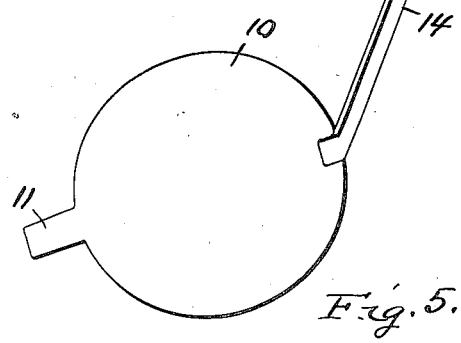

July 3, 1934.  W. G. BAUER  1,965,025
EYESHIELD
Filed June 15, 1933   3 Sheets-Sheet 3
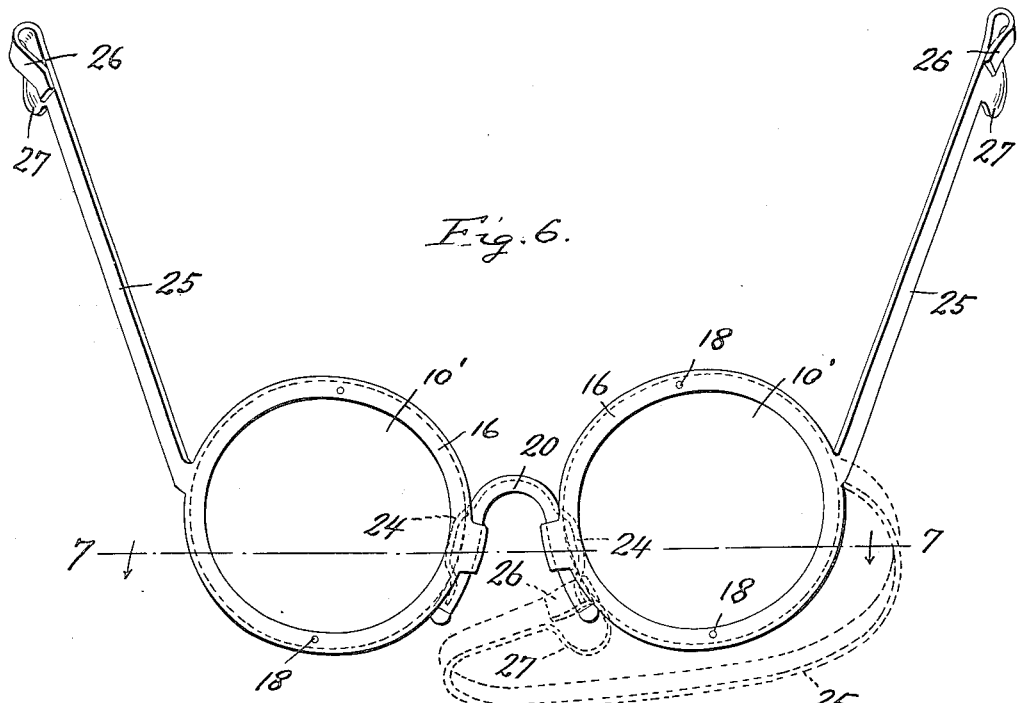
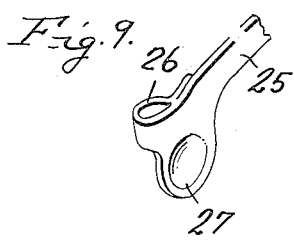 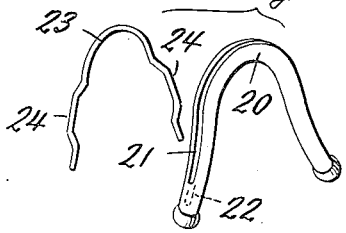
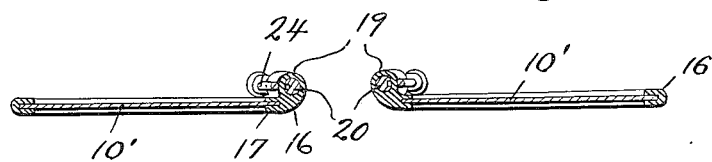
Inventor
William G. Bauer
By Clarence A. O'Brien
Attorney Patented July 3, 1934

1,965,025

UNITED STATES PATENT OFFICE 1,965,025

EYESHIELD

William G. Bauer, Bronx, N. Y.

Application June 15, 1933, Serial No. 675,993

5 Claims. (Cl. 88—41)

This invention relates to eye goggles or shields for protecting the eyes against glare, and has as its principal object the provision of a shield of this character which can be readily strapped or worn on the wrist when not in actual use.

In accordance with the present invention an anti-glare device or eye shield of a flexible nature is provided for ready application to the head for protecting the eyes, and to the wrist when it is desired to carry the shield about one's person without actually using the same.

A further object of the invention is to provide a shield of the character above mentioned which is exceedingly simple in construction, economical and practically unbreakable.

The invention together with its numerous objects and advantages will be best understood from a study of the following description taken in connection with the accompanying drawings whereon is illustrated the preferred embodiments of the invention.

It is to be understood at the outset that it is in no wise intended to restrict the invention to the precise details of construction, combination and arrangement of elements as herein illustrated and described, other than may be necessary to meet the requirements of the prior art and scope of the appended claims.

In the drawings:

Figure 1 is a face view of one embodiment of the invention.

Figure 2 is a top plan view thereof.

Figure 3 is a perspective view showing the manner of strapping or wearing the goggles on the wrist when not in use.

Figure 4 is a perspective view of the nose piece or bridge.

Figure 5 is a perspective view of an eye shield portion or transparent disk and a temple associated therewith.

Figure 6 is a view similar to Figure 1 of a slightly modified form of the invention.

Figure 7 is a sectional view taken substantially on the line 7—7 of Figure 6.

Figure 8 is an exploded view of the bridge piece and spring associated therewith and Figure 9 is a perspective view of the free end portion of a temple.

Referring to the drawings more in detail, and with reference particularly to Figures 1 to 5 inclusive it will be seen that in the form of the invention illustrated in these figures the eye shield or anti-glare goggles comprises a pair of eye shield portions 10—10 which are of identical construction and similar edge contour. The members 10—10 are preferably formed from colored celluloid although any other suitably bendable material may be employed. The members 10—10 are in the form of disks and are provided at their inner or adjacent edges with tongues formed integral therewith respectively folded upon themselves and united with the rear faces of the disks 10—10 to form sleeves or loops 11—11.

The transparencies or shield portions 10—10 are connected together by a nose or bridge piece 12 of a suitable and preferably flexible material. The nose piece 12 is bent into a substantial U and has its reversely curved sides 12a engaged in the loops or sleeves 11 as clearly shown in the drawings. Each of the sides 12a of the nose piece is also provided with a pair of spaced integral lips or extensions 13 that engage behind the shields or disks 10—10 above and below the sleeves 11 in a manner clearly shown in Figures 1 and 2 in order to hold the disks 10—10 against bearing against the eyelashes of the wearer so that the goggles or anti-glare shield may be worn comfortably.

The anti-glare disks 10—10 have secured to their outer edges by cement or otherwise one end of flexible, preferably elastic, straps or temples 14, and as will be noted, one of the straps or temples 14 is provided with a fastening element 15, at its free end while the other of said straps or temples, at its free end is provided with a fastening element 15a complemental to the fastening element 15 and engageable therewith at the back of the head for securing the goggles or anti-glare device in proper position on the head of the wearer, when the device is in use, and to engage one with the other back of the wrist in the manner clearly shown in Figure 3 when the goggles or shield is strapped to the wrist to be carried about one's person.

In applying the anti-glare device or eye shield to the wrist it has been found preferable to place the bridge piece 12 at the back of the wrist with the flexible disks 10 folded about the sides of the wrist as shown in Figure 3, and the straps 14 wrapped reversely about the wrist and over the disks 10—10; the fastening elements 15, 15a engaging one with the other in the proximity of the bridge piece 12. Thus the device can be readily worn on the wrist without inconvenience to the wearer and when thus worn will be readily accessible to use.

The form of the invention shown in Figures 6 to 9 inclusive is also adapted to be worn on the wrist when not used, and in this form of the invention the transparent disk or shield portions 10'—10' are arranged within rims or frames 16, 16 formed of rubber or other suitable flexible and durable material. As shown in the drawings the frames 16 are provided with internal annular grooves 17 to receive the edge portion of the disks 10—10 and pins or other securing devices 18—18 may be employed for positively securing the disks within the frames.

The frames 16 at their inner sides are provided with integral enlarged formations having openings therethrough and providing sleeves 19 to accommodate the reversely curved sides or legs of a substantially U-shaped bridge or nose piece 20.

In this form of the invention the nose piece 20 is provided with an external groove 21 terminating inwardly from the free ends of the sides or legs of the nose piece, and at said terminals merging into sockets 22. Accommodated in the groove 21 is a substantially U-shape spring 23 formed from a single length of wire, and the free ends of the spring are engaged in the sockets 22 as will be clear from a study of Figures 6 and 8. The legs or sides of the U-shaped spring 23 have intermediate portions thereof provided with outwardly extending substantially U-shape bends 24 providing extensions to engage behind the frames 16 to prevent the frames and the transparent disks carried thereby folding inwardly with respect to the bridge piece against the eyelashes of the wearer, the extensions 24 serving in this form of the invention substantially the same function as that served by the extensions 13 on the aforementioned bridge piece 12.

The lens frames 16 also have integral therewith temples 25, the same being preferably formed of rubber or other suitable elastic material. At their free ends the temples 25 are provided with return bends forming clips 26 adapted, when the device is applied to the wrist, to engage the bends 24 provided on the spring 23 holding the temples 25 looped about the wrist, in this instance the bends 24 serving as keepers to be engaged by the clips 26 and cooperating with the clip to provide efficient clasps to maintain the temples 25 in wrapped condition about the wrist.

Adjacent said free end the temples 25 have integral therewith concavo-convex extensions 27 serving as suction cups to engage the head behind the ears when the goggles or anti-glare shield is worn on the head for protecting the eyes.

From the above it will be seen that I have provided an efficient goggle or anti-glare shield for the eyes which can be cheaply constructed and in which, when not in actual use, may be readily strapped to the wrist, for being conveniently carried about one's person.

Having thus described my invention, what I claim as new is:—

1. An eye shield in the form of goggles comprising a pair of transparent colored members having adjacent end portions provided with integral sleeves, a substantially U-shaped nose piece having reversely curved side portions engaging said sleeves, and projections on the reversely curved side portions of the nose piece engaging behind said members as and for the purpose stated.

2. An eye shield in the form of goggles comprising a pair of transparent discs, a nose-piece connecting the discs and provided with oppositely projecting extension engaging behind the discs for spacing the discs from the face of the wearer, and flexible temples secured at one end to said discs, each of said temples at its free end being provided with means for operatively connecting the free ends of the temples together for retaining the eye shield either in operative position on the head or upon the wrist of the wearer when not in use, each of said temples adjacent its free end being also provided with an integral projection having a concave face and adapted to be pressed against the head of the wearer when the free ends of the temples are engaged one with the other.

3. In a shield of the class described, a pair of eye shields each provided with an integral sleeve, and a resilient nose piece of substantially U-shaped form and having each side thereof curved and engaging a sleeve of an eye shield, each side of the nose piece also having a lateral projection engaging one side of the adjacent eye shield, said projection and adjacent eye shield being mutually separated.

4. The herein described goggles comprising a pair of eye shields each of which includes a frame, a transparent disk mounted in the frame and a sleeve integral with the frame, a resilient nose piece having reversely curved side portions engaging the sleeves of the frames, said nose piece being provided on its outer side with a groove, and a substantially U-shaped spring seated in the groove and having laterally projected portions engaging the frames as and for the purpose specified.

5. The herein described goggles comprising a pair of eye shields each of which is formed with an integral sleeve and a resilient nose piece having side portions engaging the sleeves, each side portion of the nose piece being also provided with spaced projections overlying the inner side of an adjacent eye shield.

WILLIAM G. BAUER.